Patented July 1, 1924.

1,499,780

UNITED STATES PATENT OFFICE.

SABIN OPREAN, OF NEW YORK, N. Y.

METHOD FOR COFFEE ROASTING.

No Drawing.      Application filed July 13, 1923. Serial No. 651,427.

*To all whom it may concern:*

Be it known that I, SABIN OPREAN, a citizen of Hungary, residing at New York, in the county of New York and State of New York, have invented certain new and useful Improvements in Methods for Coffee Roasting, of which the following is a specification.

This invention relates to the roasting of coffee, having particular reference to a novel process of roasting coffee directed toward the production of an improved grade of coffee, in which the flavor qualities in the original coffee bean are preserved to the fullest extent.

The invention has for its object the provision of a novel process of roasting coffee for the purpose enumerated above.

For further comprehension of the invention, and of the objects and advantages thereof, reference will be had to the following description and to the appended claims in which the various novel features of the invention are more particularly set forth.

In carrying out my improved process the coffee is placed in an ordinary roaster and subjected to heat in the usual manner. Instead, however, of carrying the roasting operation to completion at the one operation the roasting process is stopped when about seventy-five per cent completed. The coffee beans, while still hot, are placed in a suitable receptacle and are subjected to a spray of cold water for about one minute length of time, the coffee beans being spread in a thin layer and the water sprayed in small streams.

The coffee is then again placed in the roaster and the roasting continued and carried to completion. Finally the coffee, while still hot, is placed in an air cooler of any suitable design and is subjected to the action of a blast of cold air, which may be caused by a suction fan applied to the cooler in a manner to cause the air to filter through the coffee contained in the cooler. After this final step the coffee is ready for grinding.

I have found by experiment that coffee roasted according to my improved process is of better quality as regards flavor than when prepared according to the ordinary process due to the retention of certain of the volatile contents of the coffee.

Having thus described my invention what I claim as new and desire to protect by Letters Patent of the United States is as follows:

1. The process of roasting coffee which consists in a partial roasting operation, followed by subjection of the heated coffee to cold water for a short period and final completion of the roasting operation.

2. The process of roasting coffee which consists in subjecting the coffee to the action of heat for a length of time sufficient to effect partial dehydration only, then spraying the heated coffee with cold water, and then subjecting the coffee again to the action of heat, and finally cooling with a blast of air.

3. A step in the process of roasting coffee which consists in interrupting the roasting operation when partially completed and spraying the coffee with water.

In testimony whereof I have affixed my signature.

SABIN OPREAN.